United States Patent [19]

Blum

[11] Patent Number: 5,335,742

[45] Date of Patent: Aug. 9, 1994

[54] GROUND EFFECT VEHICLE

[76] Inventor: Albert Blum, Scheiderhohe, 5204 Lohmar 1, Fed. Rep. of Germany

[21] Appl. No.: 164,306

[22] Filed: Dec. 8, 1993

Related U.S. Application Data

[63] Continuation of Ser. No. 856,035, filed as PCT/DE90/00792, Oct. 17, 1990, published as WO/91/07300, May 30, 1991, abandoned.

[30] Foreign Application Priority Data

Nov. 8, 1989 [DE] Fed. Rep. of Germany ....... 3937240

[51] Int. Cl.$^5$ ................................ B60V 1/15
[52] U.S. Cl. .................... 180/117; 244/12.1; 114/272
[58] Field of Search ............... 180/116, 117; 244/12.1, 244/12.5, 12.3, 23 R, 23 D; 114/271, 272, 292

[56] References Cited

U.S. PATENT DOCUMENTS

| 3,135,480 | 6/1964 | Chaplin, Jr. ................. | 180/116 |
| 3,244,246 | 4/1966 | Weiland ....................... | 180/116 |
| 3,262,510 | 7/1966 | Froehler ....................... | 180/117 |
| 3,672,461 | 6/1972 | Riddle et al. ................ | 180/116 |
| 4,356,787 | 11/1982 | Harley et al. ................ | 114/292 |
| 4,883,015 | 11/1989 | Jörg ............................. | 114/272 |

FOREIGN PATENT DOCUMENTS

| 2460118 | 6/1976 | Fed. Rep. of Germany ...... | 180/116 |
| 2543716 | 4/1977 | Fed. Rep. of Germany . | |
| 1338368 | 8/1963 | France ........................... | 180/116 |
| 262461 | 10/1990 | Japan ............................. | 180/116 |
| 112765 | 5/1991 | Japan ............................. | 180/117 |
| 106206 | 3/1965 | Norway ......................... | 244/12.1 |
| 936763 | 9/1963 | United Kingdom . | |
| 955923 | 4/1964 | United Kingdom ........... | 180/117 |

Primary Examiner—Brian L. Johnson
Assistant Examiner—Kevin Hurley
Attorney, Agent, or Firm—Brooks & Kushman

[57] ABSTRACT

A floatable ground effect vehicle is provided with at least one wing arrangement, at least one thrust generator (10) seated in front of the wing arrangement and at least one airflow duct (14) from the thrust generator (10) which can be directed under the wing arrangement. So that the ground effect vehicle can also be designed for a larger number of passengers, the central region of the vehicle is designed as an elongated cabin (2) which is seated on a boat-type float or is itself design as the boat hull. Stub wings (3) arranged on both sides and distributed at equal distances are provided over the length of the passenger cabin (2), the stub wings enclosing a static pressure build-up space on their lower surface. At least one separate thrust generator (10) is installed in front of at least some stub wings (3), the thrust generator being connected or connectable to the respective static pressure build-up space by means of an airflow duct (14).

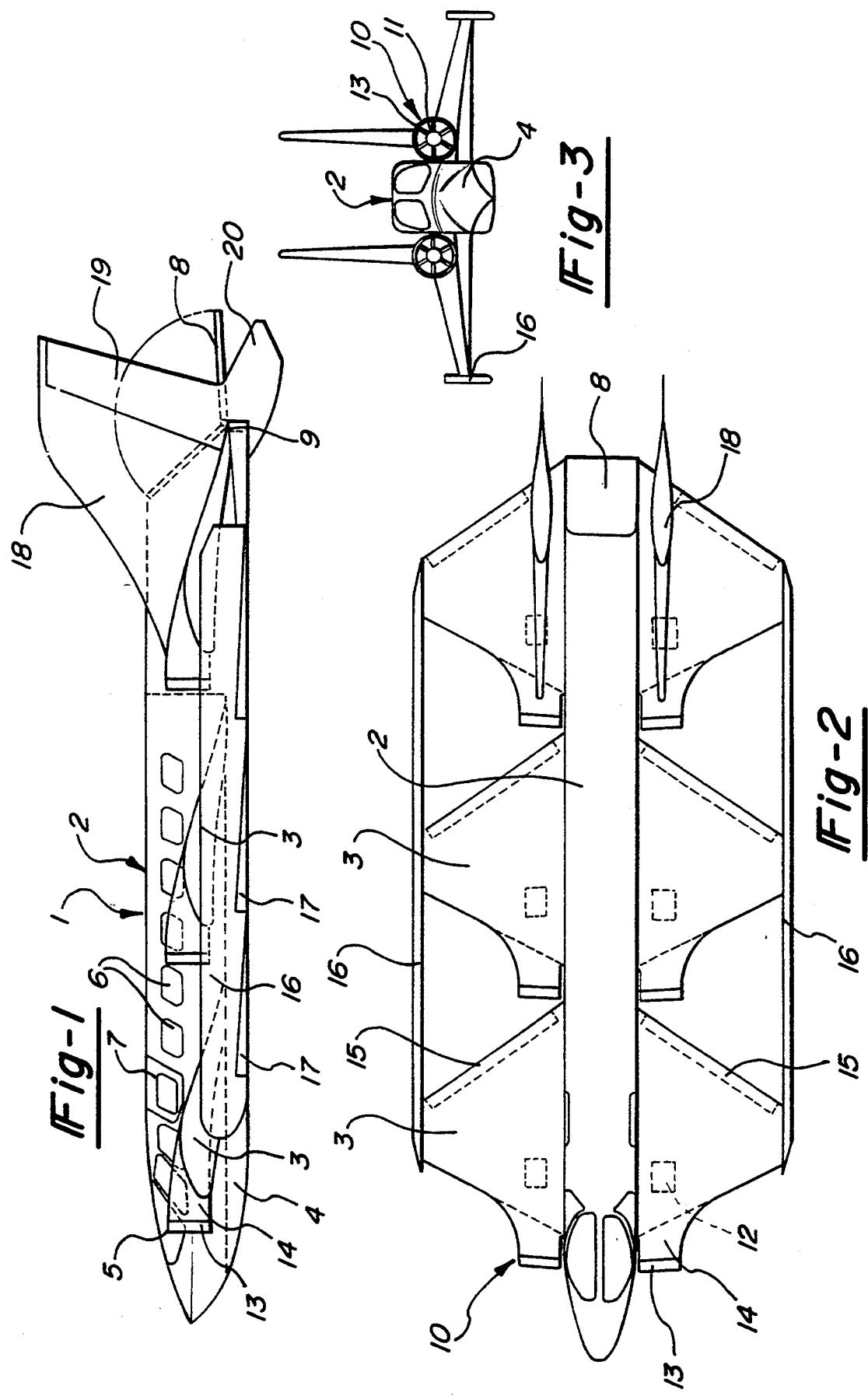

GROUND EFFECT VEHICLE

This is a continuation of copending application(s) Ser. No. 07/856,035, filed as PCT/DE90/00790, published as WO/91/07300, May 30, 1991, now abandoned.

TECHNICAL FIELD

The invention concerns a floatable ground effect vehicle with at least one wing arrangement, at least one thrust generator seated in front of the wing arrangement and at least one airflow duct from the thrust generator which is directed or can be directed under the wing arrangement and by which an air jet can be conducted under the wing arrangement.

BACKGROUND ART

In ground effect vehicles, the air flowing into the hollow space under the wing arrangement during flight near a ground or water surface generates a buildup of static pressure which acts like an air cushion on which the vehicle can slide. The resistance to movement can be substantially reduced by this means. The vehicle is trimmed to an appropriate height above the water or ground surface and is automatically established in flight altitude by the interaction of the elevator and the engine power installed. Because of the low resistance, the vehicle requires only small propulsion powers.

In a known ground effect vehicle (EP 0 170 46), the wing arrangement is designed as a supporting body on whose upper surface is located a passenger cabin. This known ground effect vehicle is only designed for a small number of passengers or for small loads.

SUMMARY OF THE INVENTION

The invention is based on the object of further developing the floatable version of the known ground effect machine in such a way that it can also be designed for carrying a large number of passengers.

According to the invention, this object is achieved in that the central region of the vehicle is designed as an elongated cabin for a larger number of passengers, in that the passenger cabin is seated on a boat-type float or is designed as the boat hull, in that stub wings arranged on both sides and distributed at equal distances are provided over the length of the passenger cabin, the stub wings enclosing a static pressure build-up space on their lower surface, and in that at least one separate thrust generator is installed in front of at least some stub wings, the thrust generator being connected or connectable to the respective static pressure build-up space by means of an airflow duct.

In the ground effect vehicle according to the invention, it is immediately possible to make the passenger area arbitrarily large and, in fact, of the order of magnitude of a bus or a passenger aircraft. Several stub wing pairs are then arranged in tandem over the length of the elongated fuselage so that the ground effect can become effective over the total length of the passenger cabin because the airflow of each thrust generator is supplied to the respective static pressure build-up space under the stub wings.

In a vehicle version in which the passenger cabin holds some 20 to 30 people, for example, it is possible to arrange three stub wing pairs in tandem. It is also possible, however, to design the passenger cabin for 100 or more people and to design it, in this case, be correspondingly longer. In the longer version, it is then expedient to attach five or more stub wing pairs to the sides of the passenger cabin.

The free outer ends of the stub wings are each preferably connected at both extremities to a common float located in the direction of travel. In the first place, this increases the floating stability when the vehicle is at rest or traveling at low speeds—at which the ground effect has not yet occurred. In the second place, however, the traveling comfort is increased by the improved mechanical stability at larger speeds—at which the vehicle rises from the water surface because of the ground effect.

For better separation of the water flow, the lower surfaces of the floats can be offset several times, each offset region rising in the direction of travel. This improves the sliding behavior of the float in the water.

In order to maneuver the vehicle, it is expedient to arrange at least one fin with rudder at the rear end of the passenger cabin.

In order to improve the maneuverability, two parallel fins with rudders are preferably arranged at a distance from one another.

A door can be provided at the rear end of the passenger cabin so that the passengers can enter and leave and, in a preferred embodiment, this door is located, for example, between the two fins.

The door can be pivotable about a lower axis located transverse to the longitudinal axis of the passenger cabin so that the inside of the door can be used as a gangway between the inside of the cabin space and a landing place when the door is opened and folded down.

In order to ensure good maneuverability even at low speeds when the vehicle is still floating on the water, the lower section of the respective rudder can extend sufficiently far downwards for it to be immersed in the water at least in the floating condition of the vehicle. The lower section of the respective rudder then acts like the rudder of a ship.

So that the ground effect vehicle according to the invention can be manufactured in a rational manner in various sizes, it can be produced in modular construction. It is then possible for each passenger cabin section and an associated stub wing pair to form a constructional module.

Alternatively, however, the passenger cabin can also be manufactured as a separate central part whereas only the individual stub wings, including thrust generator, each form a module part. One or more thrust generators can be provided on an individual stub wing depending on the thrust force required.

For aerodynamic reasons, the front stub wing pair can be designed without thrust generators.

BRIEF DESCRIPTION OF THE DRAWINGS

FIG. 1 is a side elevational view of the floatable ground effect vehicle of the present invention shown accommodating approximately 20 to 30 people and having three stub wing pairs, FIG. 2 is a plan view of the ground effect vehicle of the present invention shown in FIG. 1; and FIG. 3 is a front elevational view of the ground effect vehicle of the present invention shown in FIGS. 1 and 2.

BEST MODE FOR CARRYING OUT THE INVENTION

From the drawing, the ground effect vehicle 1 consists of an elongated passenger cabin 2, over whose length are arranged stub wings 3 distributed at equal distances on both sides.

The passenger cabin 2, which forms the central component of the ground effect vehicle 1, is seated on a boat-type float or is itself designed, on its lower surface, after the fashion of a boat hull 4.

The passenger cabin 2, which is designed for some 20 to 30 passengers in the illustrative example shown in the drawing, is provided with a cockpit 5 in the front region, in a similar manner to an aircraft, and this is followed towards the rear in the drawing by rows of seats, arranged one behind the other and not shown in the drawing. Windows 6 are provided for the passengers on both sides of the passenger cabin.

Doors 7 are provided behind the cockpit 5 on both sides of the passenger cabin 2 and, in emergency, the occupants can enter and leave through these.

If a fairly large stationary landing place is available in the region of the landing location, the occupants can enter and leave through a pivoting door 8 provided at the end of the passenger cabin 2. The pivoting door can be pivoted about a lower axis 9 located transverse to the longitudinal axis of the passenger cabin 2. In the open, folded-down condition of the pivoting door, in which the outer surface of the door is in contact with the landing place, the inside of the door is used as a gangway for the passengers so that they can enter and leave in comfort.

The stub wings 3 arranged in pairs on both sides of the passenger cabin 2 are fastened to the side surfaces of the passenger cabin 2. In the illustrative example shown in the drawing, three stub wing pairs arranged in tandem are provided.

One thrust generator 10 is installed in front of each stub wing 3. This consists of a propeller 11, which is driven by an engine 12 located in the region of the stub wing. Each propeller 11 is surrounded by an inlet diffuser 13 from which an airflow duct 14 leads under the associated stub wing 3. Because of this, the air flow generated by the propeller 11 not only causes propulsion of the vehicle in a horizontal direction but, simultaneously, it also generates a static pressure build-up under the respective stub wing so that a powerful vertical lift is immediately generated by ground effect and, in consequence, a rapid increase in speed can take place. So that the static pressure build-up can form effectively, the stub wings are designed in such a way that they cover a defined static pressure build-up space. Pivotable flaps 15 are provided at the rear ends of the stub wings and these can be used to vary the static pressure build-up effect.

In plan view, the stub wings are designed to be trapezoidal, the longer base side being adjacent to the passenger cabin 2.

The stub wings 3 are arranged in tandem on the passenger cabin 2 at a relatively small distance from one another. The parallel sides opposite to the trapezoidal base side and pointing outwards are designed to be relatively short so that the stub wings converge relatively sharply to the outside.

The outer ends of the stub wings 3 are fastened at their extremities to a common float 16 located in the direction of travel. The two floats 16 are offset several times on their lower surfaces, each offset region 17 each rising in the direction of travel.

Two parallel fins 18 each with a rudder 19 are arranged at a distance from one another on both sides of the rear end of the passenger cabin 2. As may be seen, particularly from FIG. 2, the fins 18 are fastened to the two rear stub wings 3. The lower section 20 of each rudder 19 extends sufficiently far downwards for it to be immersed in the water in the floating condition of the vehicle and it can, therefore, be used for maneuvering the vehicle at low speeds.

The two finds are sufficiently far apart for the pivoting door 8 located between them to be conveniently pivoted up and down and used by the passengers for entering and leaving.

I claim:

1. A floatable ground effect vehicle comprising:
    an elongated passenger cabin having a boat-like hull;
    at least two pair of stub wings affixed to the sides of said passenger cabin in tandem, each of said stub wings having a first end affixed to said passenger cabin and a second end, a lower surface of each of said stub wings, enclosing a static pressure build-up space;
    a thrust generator associated with each stub wing adapted to generate a sufficient air flow necessary to form both a static pressure build-up under said associated stub wing providing a powerlift of said vehicle in a vertical direction and a propulsion pressure providing a propulsion of said vehicle in a horizontal direction; and
    an airflow duct provided on each of said stub wings, said air flow duct supporting said associated thrust generator forward of said stub wing and directing said airflow to said static pressure build-up space, said airflow duct thereby cooperating with said thrust generator to provide said static pressure build-up and said propulsion pressure.

2. The floatable ground effect vehicle as in claim 1, further comprising a pair of secondary float members, said secondary float members affixed to respective second ends of said stub wings and oriented in a direction of travel.

3. The floatable ground effect vehicle as in claim 2, wherein said second float members have at least one offset creating at least two offset regions, each of offset regions rising in the direction of travel.

4. The floatable ground effect vehicle as in claim 1, wherein said ground effect vehicle has a forward end and a rear end, said ground effect vehicle further having at least one vertical fin and at least one rudder disposed adjacent said rear end.

5. The floatable ground effect vehicle as in claim 1, wherein said ground effect vehicle has a forward end and a rear end, said ground effect vehicle further having a pair of vertical fine and a pair of rudders disposed adjacent said rear end.

6. The floatable ground effect vehicle as in claim 5, wherein each of said rudders have an upper section and a lower section operative to extend sufficiently in the water when the ground effect vehicle is in a floating condition.

7. The floatable ground effect vehicle as in claim 6, wherein said rear end of said ground effect vehicle further includes a pivoting door positioned between said pair of vertical fins for entering and existing said passenger cabin.

8. The floatable ground effect vehicle, as in claim 7, wherein said pivoting door is pivotable about a lower axis located transverse to the longitudinal access of said passenger cabin such that when said pivoting door is in its open, fold-down condition, there is provided a gangway between said passenger cabin and a landing place.

9. The floatable ground effect vehicle, as in claim 1, wherein said passenger cabin and associated stub wing pair including said thrust generators are interchangeably connectable such that the ground effect vehicle can be produced in modulator construction.

10. A floatable ground effect vehicle comprising:
an elongated passenger cabin having a boat-like hull;
a front pair of stub wings affixed to the sides of said passenger cabin, said front stub wings having a first end affixed to said passenger cabin and a second end said first and having a length greater than said second end, and a lower surface of each of said front stub wings enclosing a static pressure build-up space;
at least one pair of rear stub wings affixed to the sides of said passenger cabin, said rear stub wings having a first end affixed to said passenger cabin and a second end, said first end having a length greater than said second end, and a lower surface of each of said rear stub wings enclosing a static pressure build-up space;
a thrust generator associated with each of said front and rear stub wings adapted to generate a sufficient air flow necessary to form both a static pressure build-up under said associated stub wing providing a powerlift of said vehicle in a vertical direction and a propulsion pressure providing a propulsion of said vehicle in a horizontal direction; and
an airflow duct provided on each of said front and rear stub wings, said air flow duct supporting said associated thrust generator forward of said front and rear stub wings and directing said airflow to said static pressure build-up space, said airflow duct thereby cooperating with said associated thrust generator to provide said static pressure build-up and said propulsion pressure.

* * * * *